(12) United States Patent
Sada-Salinas

(10) Patent No.: US 9,776,713 B2
(45) Date of Patent: Oct. 3, 2017

(54) OFF-BOARD GYROCOPTER TAKE-OFF SYSTEMS AND ASSOCIATED METHODS

(71) Applicant: Jaime G. Sada-Salinas, San Antonio, TX (US)

(72) Inventor: Jaime G. Sada-Salinas, San Antonio, TX (US)

( * ) Notice: Subject to any disclaimer, the term of this patent is extended or adjusted under 35 U.S.C. 154(b) by 102 days.

(21) Appl. No.: 14/602,190

(22) Filed: Jan. 21, 2015

(65) Prior Publication Data
US 2016/0207617 A1 Jul. 21, 2016

(51) Int. Cl.
*B64C 27/02* (2006.01)
*B64F 1/04* (2006.01)

(52) U.S. Cl.
CPC .............. *B64C 27/025* (2013.01); *B64F 1/04* (2013.01)

(58) Field of Classification Search
CPC . B64C 27/025; B64C 27/02; B64C 2201/024; B64C 27/52; B64C 39/024; B64D 31/04; B64D 27/02; B64F 1/04
See application file for complete search history.

(56) References Cited

U.S. PATENT DOCUMENTS

| | | | |
|---|---|---|---|
| 2,404,419 A | 7/1946 | Weatherly et al. | |
| 2,577,330 A * | 12/1951 | Johnston | B64F 1/16 188/32 |
| 3,720,387 A | 3/1973 | Foote | |
| 4,765,567 A * | 8/1988 | Gutman | B64C 27/02 244/17.11 |
| 5,301,900 A * | 4/1994 | Groen | B64C 27/43 244/17.11 |
| 2012/0068006 A1 | 3/2012 | Jones et al. | |
| 2012/0091259 A1* | 4/2012 | Morris | B64C 27/02 244/17.13 |

FOREIGN PATENT DOCUMENTS

| | | | |
|---|---|---|---|
| DE | WO 2011026478 A2 * | 3/2011 | .......... B64C 27/025 |
| EP | 318477 B1 | 3/1993 | |
| EP | 1724192 A1 | 11/2006 | |
| EP | 1924494 A1 | 5/2008 | |
| EP | 1731420 B1 | 9/2009 | |
| EP | 2279943 A1 | 2/2011 | |
| EP | 2383184 B1 | 3/2012 | |
| EP | 2105378 B1 | 5/2012 | |
| EP | 2464566 A2 | 6/2012 | |
| WO | 9318966 A1 | 9/1993 | |
| WO | 9830447 | 7/1998 | |

(Continued)

OTHER PUBLICATIONS

International Search Report and Written Opinion issued for PCT/US2016/013998 and dated Jun. 9, 2016, 9 pages.

*Primary Examiner* — Valentina Xavier
(74) *Attorney, Agent, or Firm* — Perkins Coie LLP

(57) ABSTRACT

Off-board gyrocopter take-off systems and associated methods are disclosed. A representative method includes restraining a gyrocopter from vertical and lateral movement, pre-rotating a fixed-pitch lift rotor of the gyrocopter via a power source located off the gyrocopter, and releasing the gyrocopter for vertical movement to allow the gyrocopter to lift under a force provided by the lift rotor. Optionally, the method can further include interrupting or reducing power from the power source to the gyrocopter as a way to release the gyrocopter for vertical movement.

37 Claims, 13 Drawing Sheets

(56) References Cited

FOREIGN PATENT DOCUMENTS

| WO | 2010135727 A1 | 11/2010 |
|---|---|---|
| WO | 2011146349 A2 | 11/2011 |
| WO | 2014094870 A1 | 6/2014 |
| WO | 2014155208 A1 | 10/2014 |
| WO | 2016118554 A1 | 7/2016 |

\* cited by examiner

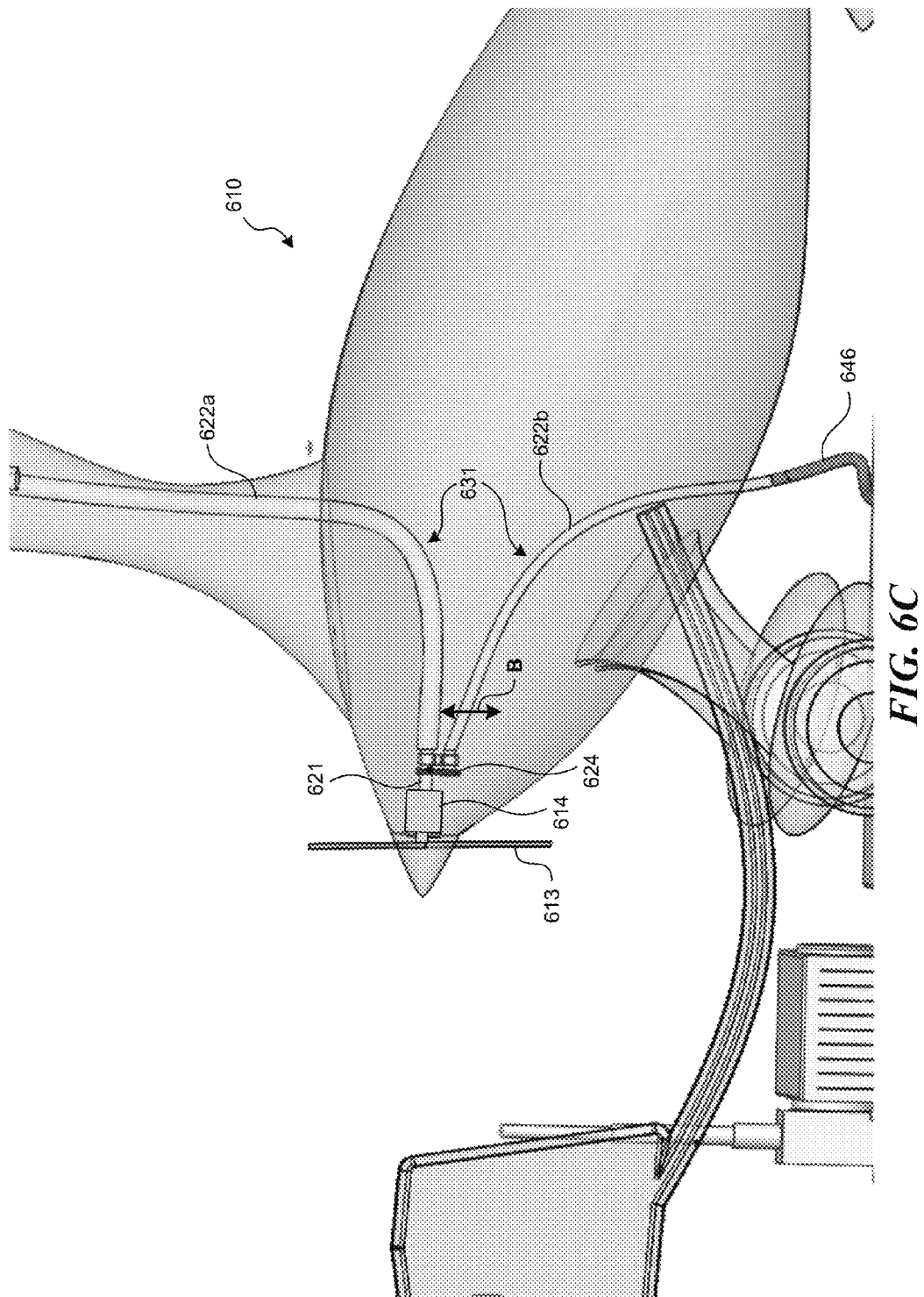

OFF-BOARD GYROCOPTER TAKE-OFF SYSTEMS AND ASSOCIATED METHODS

TECHNICAL FIELD

The present disclosure is directed generally to off-board gyrocopter take-off systems and associated methods. The technology can be applied to manned and/or unmanned gyrocopters.

BACKGROUND

A gyrocopter is an aircraft that flies using a combination of a powered propeller and an unpowered set of rotary wings. The propeller provides the aircraft with forward thrust, and the rotary wings (or rotor) autorotate to generate a lift as a result of the forward thrust of the aircraft. Unlike a helicopter, a gyrocopter typically requires some length of runaway for both take-off and landing. Unlike a fixed wing aircraft, the ability of the rotor to autorotate as the gyrocopter gains forward speed significantly reduces the distance required for both take-off and landing.

One approach used to further reduce the gyrocopter's take-off and landing distance is to pre-rotate the rotor so that it begins generating lift before the gyrocopter begins to move in a forward direction. In a typical arrangement, a gyrocopter pre-rotator uses power from the gyrocopter engine (which otherwise produces power for the thrust propeller), for example, via a clutched drive drum or drive wheel combination. The drive system typically includes a drive shaft having a first gear that engages with a corresponding second gear carried by the rotor. The drive system can include a flexible shaft or a fixed shaft, such as a shaft coupled between universal joints.

One drawback with the foregoing approach is that the gyrocopter rotor typically has a fixed pitch. As a result, the lift generated by the rotor (when powered by the pre-rotator) is typically not enough to eliminate the need for a runway. Accordingly, one approach to address the foregoing problem is to provide the rotor with a collective pitch control. In operation, the pitch control is initially set to zero pitch to reduce the drag on the rotor and reduce the requirements for spinning the rotor up. Once the rotor has been spun up, the pitch of the rotor blades is suddenly increased, causing the gyrocopter to rise suddenly in a "jump take-off" maneuver.

However, the "jump take-off" system also has drawbacks. For example, this approach can significantly increase the complexity of the rotor head because the rotor head must be configured to pitch the rotor blades. As a result, the initial cost of the gyrocopter and the level of maintenance required to keep the gyrocopter in operation may increase to the point where the gyrocopter is nearly as costly as a helicopter. In such instances, many commercial operators prefer a helicopter, which does not need a pre-rotator for zero distance take-offs. Accordingly, there remains a need for cost-effective gyrocopters that require no take-off or landing roll.

BRIEF DESCRIPTION OF THE DRAWINGS

FIG. 6C is an enlarged illustration of a rear portion of the gyrocopter shown in FIGS. 6A and 6B.

DETAILED DESCRIPTION

Figure 1:
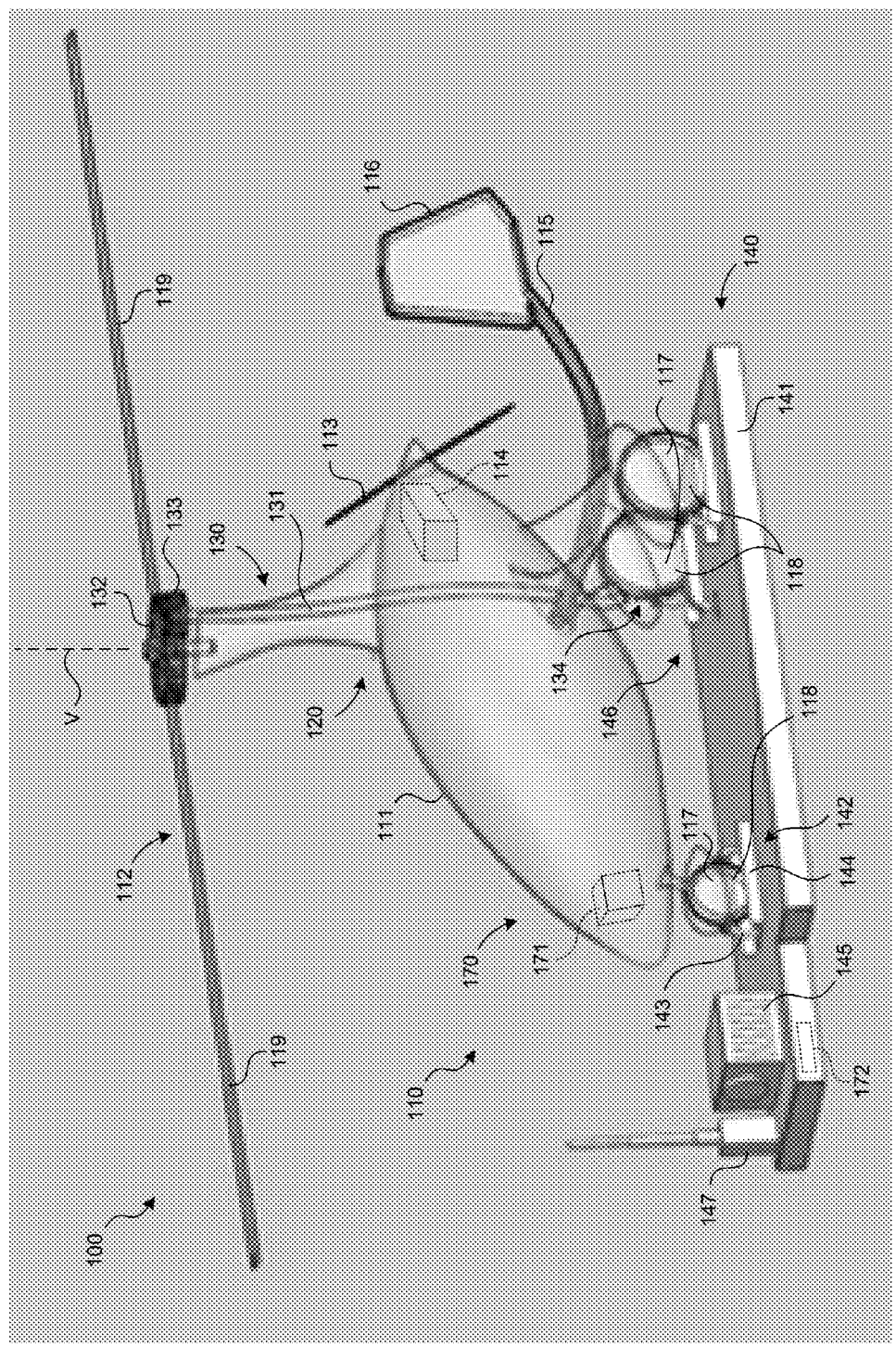
FIG. 1 is a partially schematic, side isometric view of a system that includes a gyrocopter and a pre-rotator that is carried, at least in part, off the gyrocopter, in accordance with an embodiment of the present technology.

The present technology is directed generally to off-board gyrocopter take-off systems, and associated methods. Specific details of several embodiments of the disclosed technology are described below with reference to particular, representative configurations. In other embodiments, the disclosed technology can be practiced in accordance with gyrocopters and associated systems having other configurations. Specific details describing structures or processes that are well-known and often associated with gyrocopters, but that may unnecessarily obscure some significant aspects of the presently disclosed technology, are not set forth in the following description for purposes of clarity. Moreover, although the following disclosure sets forth several embodiments of different aspects of the disclosed technology, several other embodiments of the technology can have configurations and/or components different than those described in this section. As such, the present technology may have other embodiments with additional elements, and/or without several of the elements described below with reference to FIGS. 1-9.

Several embodiments of the disclosed technology may take the form of computer-executable instructions, including routines executed by a programmable computer or controller. Those skilled in the relevant art will appreciate that the technology can be practiced on computer or controller systems other than those shown and described below. The technology can be embodied in a special-purpose computer, controller, or data processor that is specifically programmed, configured or constructed to perform one or more of the computer-executable instructions described below. Accordingly, the terms "computer" and "controller" as generally used herein include a suitable data processor and can include internet appliances and hand-held devices, including palmtop computers, wearable computers, cellular or mobile phones, multi-processor systems, processor-based or programmable consumer electronics, network computers, mini computers and the like. Information handled by these computers can be presented at any suitable display medium, including a liquid crystal display (LCD). As described further below with reference to FIG. 1, the term "controller" can also include mechanical and electromechanical devices.

The present technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including, magnetic or optically readable or removable computer discs, as well as distributed electronically over networks. Data structures and transmissions of data particular to aspects of the technology are also encompassed within the scope of the present technology.

FIG. 1 is a partially schematic, side isometric illustration of an overall system 100 that includes a manned or unmanned gyrocopter 110 configured to take off with no requirement for a runway or other take-off path. Instead, the gyrocopter 110 can include a lift rotor 112 that lifts the gyrocopter vertically. In a further aspect of this embodiment, the lift rotor 112 has fixed-pitch blades 119 instead of variable-pitch blades. The fixed-pitch blades 119 can be powered by a pre-rotator 120. The pre-rotator 120 includes on-board pre-rotator components 130 and off-board pre-rotator components 140 that are releasably coupled together to launch the gyrocopter 110 into vertical flight without a runway and without pitchable lift rotor blades. Once the gyrocopter 110 is launched (or as part of the launch process), the on-board pre-rotator components 130 disengage from the off-board pre-rotator components 140, and the gyrocopter 110 continues its flight.

In a particular embodiment, the gyrocopter 110 includes a body or fuselage 111 that supports the lift rotor 112. The lift rotor 112 can have a "teeter-totter" arrangement that allows it to tilt significantly relative to the vertical axis V of the vehicle, so as to auto-rotate and provide lift during forward flight. Because the rotor 112 can have a fixed-pitch configuration, the individual blades 119 do not change pitch relative to each other, even as the rotor 112 itself tilts.

The thrust for forward flight is provided by a propeller 113 which is coupled to an on-board power source 114 (e.g., a first power source). The on-board power source 114 can include an electric motor, an internal combustion engine, or another suitable engine configured to provide sufficient power to the propeller 113. During normal flight, the propeller 113 is powered and the lift rotor 112 is unpowered, as is typical for a gyrocopter configuration.

The gyrocopter 110 can further include landing gear 117 (e.g., wheels 118, skids, and/or other suitable devices). In particular embodiments, the landing gear 117 are restrained during a pre-rotation operation, as will be discussed in further detail below. The gyrocopter 110 can also include a tail boom 115 and a vertical stabilizer 116 to provide for lateral stability and control.

The on-board pre-rotator components 130 can include an on-board transmission device 131 having a first coupling 133 that transmits power to the lift rotor 112. Accordingly, the lift rotor 112 can include a corresponding rotor coupling 132 that engages with the first coupling 133. In a particular embodiment, the first coupling 133 includes a gear or sprocket, and the rotor coupling 132 includes a corresponding, meshing gear or sprocket. The first coupling 133 can be selectively disengaged from the rotor coupling 132, e.g., to allow the rotor 112 to tilt, and/or to reduce wear on the on-board transmission device 131 when the pre-rotator 120 is not in use. In other embodiments, an arrangement of pulleys and belts, including a tensioning or "swinging" pulley, is used to connect the lift rotor 112 and the on-board transmission device 131, and to account for relative motion between the two, In still further embodiments, the rotor coupling 132 and the first coupling 133 can remain engaged, and power supplied to the on-board transmission device 131 is controlled via clutch. The transmission device 131 can include a flexible coupling arrangement, e.g., a flexible cable or shaft that rotates within a flexible sleeve or housing, generally similar in operation to a tachometer or speedometer cable. In other embodiments, the transmission device 131 can include other suitable arrangements that provide sufficient torque to the rotor 112. Such arrangements can include multiple fixed shafts coupled in series with universal joints, among other arrangements. In any of these embodiments, the on-board transmission device 131 can include a second coupling 134 (e.g., an on-board coupling) that receives power from the off-board pre-rotator components 140 during the pre-rotator operation.

The off-board pre-rotator components 140 can be carried by a base or support 141, or can have other locations or positions that are off the gyrocopter 110 (e.g., directly on the ground or on another vehicle). The off-board components 140 can include an off-board transmission device 146 that releasably couples to the second coupling 134 of the on-board transmission device 131. The off-board transmission device 146 can also be coupled to a motor or other off-board power source 145 (e.g., a second power source), both of which can be carried by the base 141. The base 141 can be releasably attached to the ground, using suitable tie-downs, weights, or other arrangements. In other embodiments, the base 141 can be carried by a separate transport vehicle, for example, a truck. The base 141 can remain onboard the transport vehicle during operation, or it can be taken on and off the transport vehicle between operations. In any of these embodiments, the off-board components 140 can also include a restraint system 142 that keeps the gyrocopter 110 in position while the lift rotor 112 is spun up for take-off. In a particular embodiment, the restraint system 142 can include one or more vertical restraints 143 and/or one or more lateral restraints 144. The restraint system 142 is accordingly configured to prevent or at least significantly restrict the gyrocopter 110 from lifting, moving laterally (forward, backward and/or side-to-side), and/or rotating while the lift rotor 112 is spun up.

The operation of the system 100 can be controlled by a control system 170. The control system 170 can include an on-board controller or controller components 171 and/or an off-board controller or controller components 172. The controllers/components 171, 172 can communicate with each other and/or with other systems or system components via a wireless communication device 147. The controllers/components 171, 172 can include mechanical controls, electrical controls and/or digital controls, and can respond to inputs (e.g., sensor inputs) with outputs (e.g., command signals) using software, firmware and/or hardware that is configured and/or programmed to carry out the planned actions. The planned actions can include starting, stopping, accelerating and/or decelerating the off-board power source 145, engaging and disengaging the restraint system 142 and/or engaging and disengaging the on-board transmission device 131 and the off-board transmission device 146. In addition, the controllers/components 171, 172 can carry out other functions, for example, controlling the on-board power source 114 and/or other functions, for example, if the gyrocopter 110 is unmanned.

Figure 2:
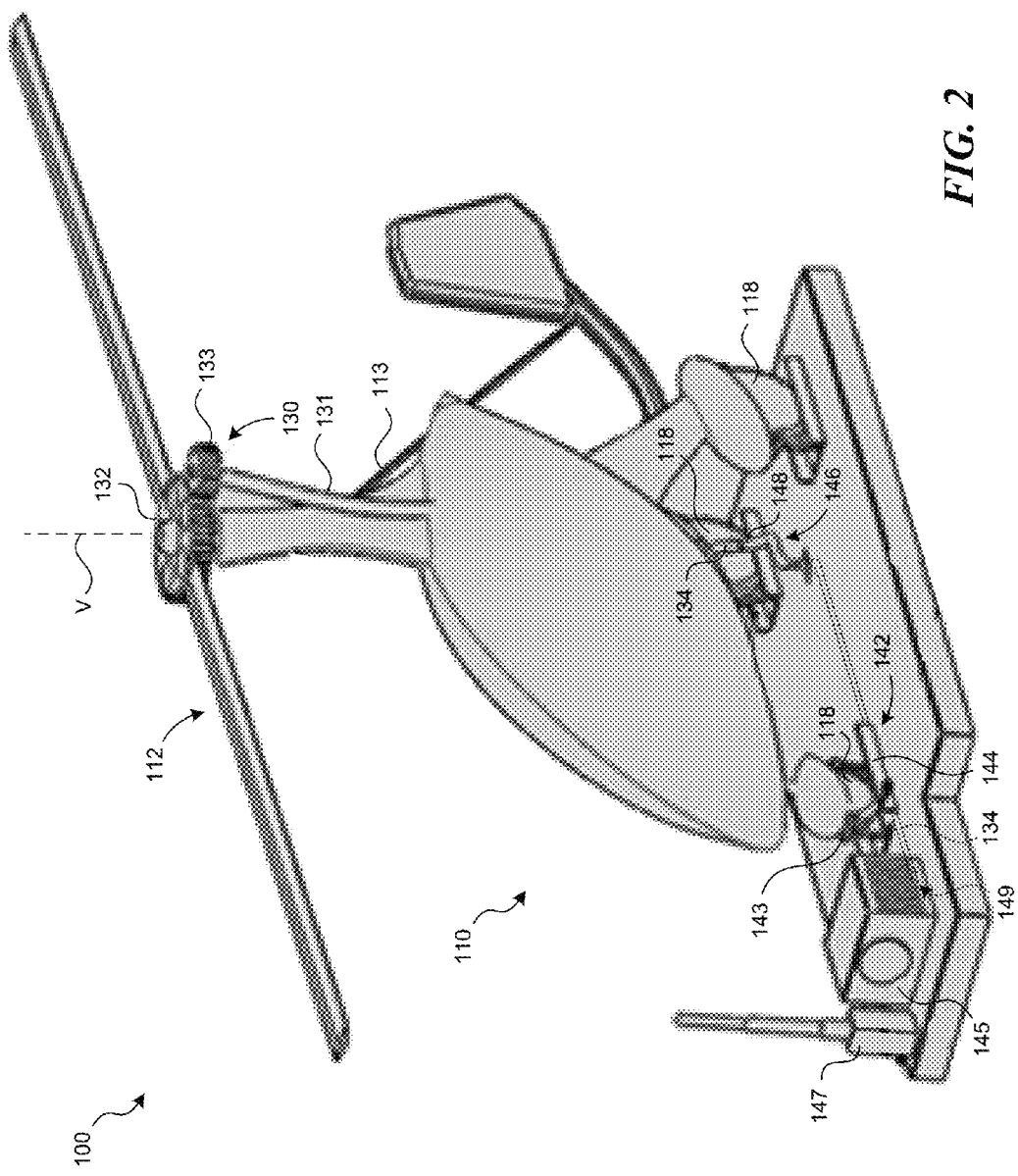
FIG. 2 is a partially schematic, front isometric illustration of the system shown in FIG. 1.

FIG. 2 is a partially schematic, front isometric illustration of the system 100 described above with reference to FIG. 1. As shown in FIG. 2, the off-board transmission device 146 can include a first coupling 148 (e.g., an off-board coupling) that is releasably coupled to the second coupling 134 (e.g., the on-board coupling) of the on-board transmission device 131. The off-board transmission device 146 can further include a second coupling 149 that is connected to the off-board power source 145.

As is also shown in FIG. 2, the restraint system 142 can include the lateral restraints 144 (e.g., having an upright flange configuration or other suitable configuration) that engage with the sides of the gyrocopter wheels 118 and/or other portions of the landing gear 117. The vertical restraint 143 can include an arrangement of clamps that both hold the wheels 118 down (e.g., by engaging surfaces of the wheels that face at least partially upwards) and prevent the wheels 118 from rolling forward. Accordingly, the combination of the vertical restraint 143 and the lateral restraint 144 can prevent the gyrocopter 110 from moving forward, laterally, upwardly, and rotationally about the vehicle vertical axis V. In an embodiment shown in FIG. 2, the restraint system 143 applies a restraining force to all three wheels 118 of the gyrocopter 110. In other embodiments, the restraint system 143 can apply a restraining force to fewer wheels 118 and/or to other landing gear and/or to other (non-landing gear) components of the gyrocopter 110.

Figure 3:
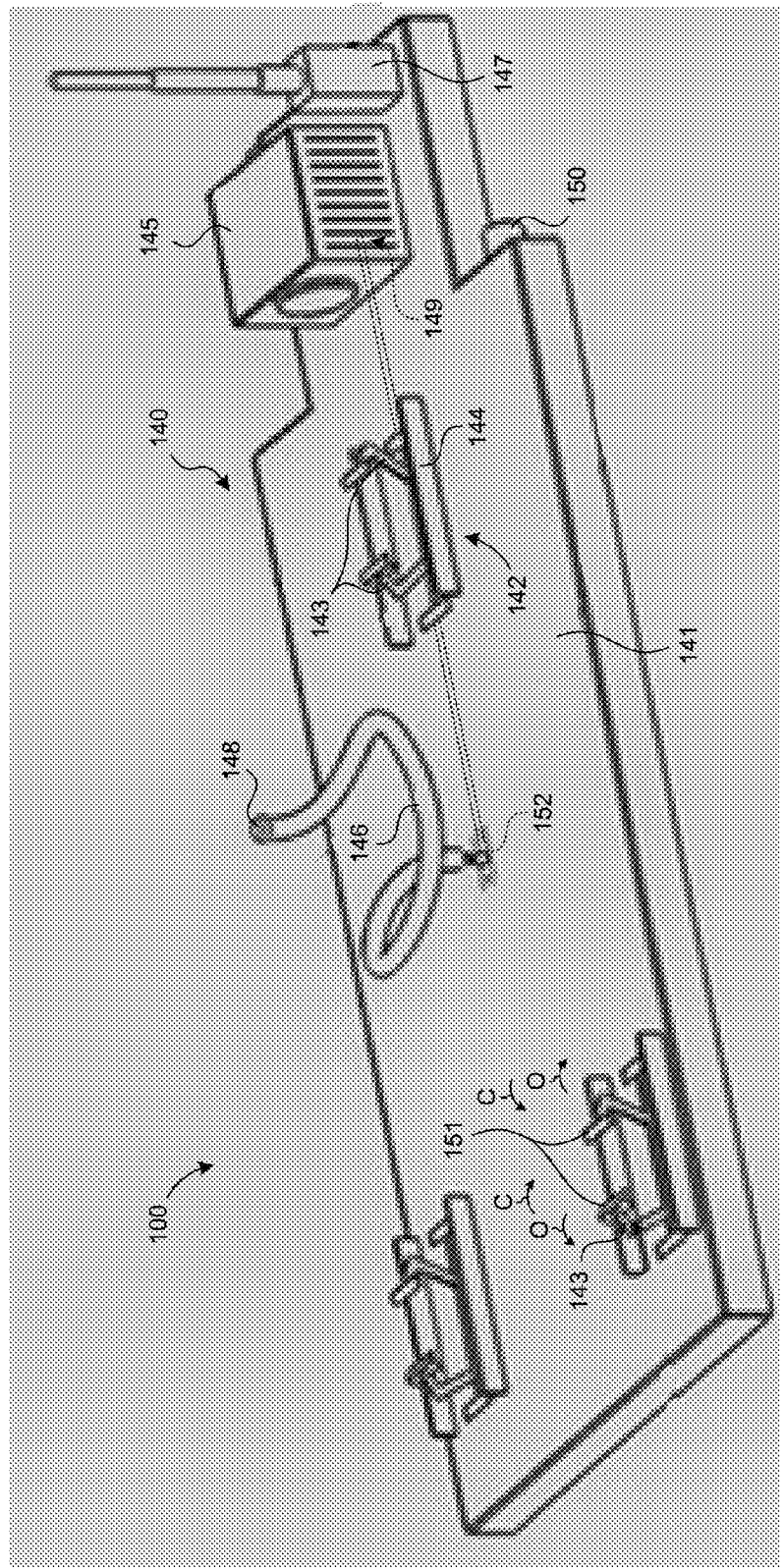
FIG. 3 is a partially schematic, side isometric illustration of the off-board portion of the system shown in FIGS. 1 and 2, configured in accordance with an embodiment of the present technology.

FIG. 3 is a partially schematic, side isometric illustration of representative off-board components 140 of the system 100. For purposes of illustration the gyrocopter shown in FIGS. 1 and 2 is not shown in FIG. 3. As is shown in FIG. 3, the vertical restraint 143 can include multiple, pivoting engagement elements 151 that can pivot inwardly toward a closed, engaged, or capture position, as indicated by arrows C to engage with the wheels 118 (FIG. 2) of the gyrocopter 110. The engagement elements 151 can pivot outwardly as indicated by arrows O to release the gyrocopter. The off-board transmission device 146 can include a flexible link, for example, having a cable or shaft within a sleeve configuration generally similar to a speedometer cable or tachometer cable, as described above with reference to the on-board transmission device 131. In other embodiments, the off-board transmission device 146 can have other suitable arrangements, for example, a fixed shaft arrangement. In any of these embodiments, the off-board transmission device 146 can include an intermediate coupling 152 that provides a link between the first coupling 148 (which engages with the gyrocopter) and the second coupling 149 (which engages with the off-board power source 145).

In particular embodiments, the system 100 can include one or more release mechanisms 150 that disengage the restraint system 142. A representative release mechanism 150 includes an arrangement of cables, powered solenoids, and/or other mechanical or electro-mechanical devices that change the configuration or state of the restraint system 142 from an engaged configuration or state to a disengaged configuration or state, and back again. The release mechanism 150 can be triggered manually, automatically, or via a combination of manually and automatically operated elements. For example, when the release mechanism 150 is to be engaged or disengaged, this operation can be triggered automatically from the ground or from the gyrocopter itself, with or without manual input depending on the embodiment. In any of the foregoing embodiments, the release mechanism 150 can be changeable between a first configuration in which it is positioned to restrain or at least partially restrain the gyrocopter 110 from movement, and a second configuration in which the release mechanism 150 is positioned not to restrain the gyrocopter 110.

Figure 4:
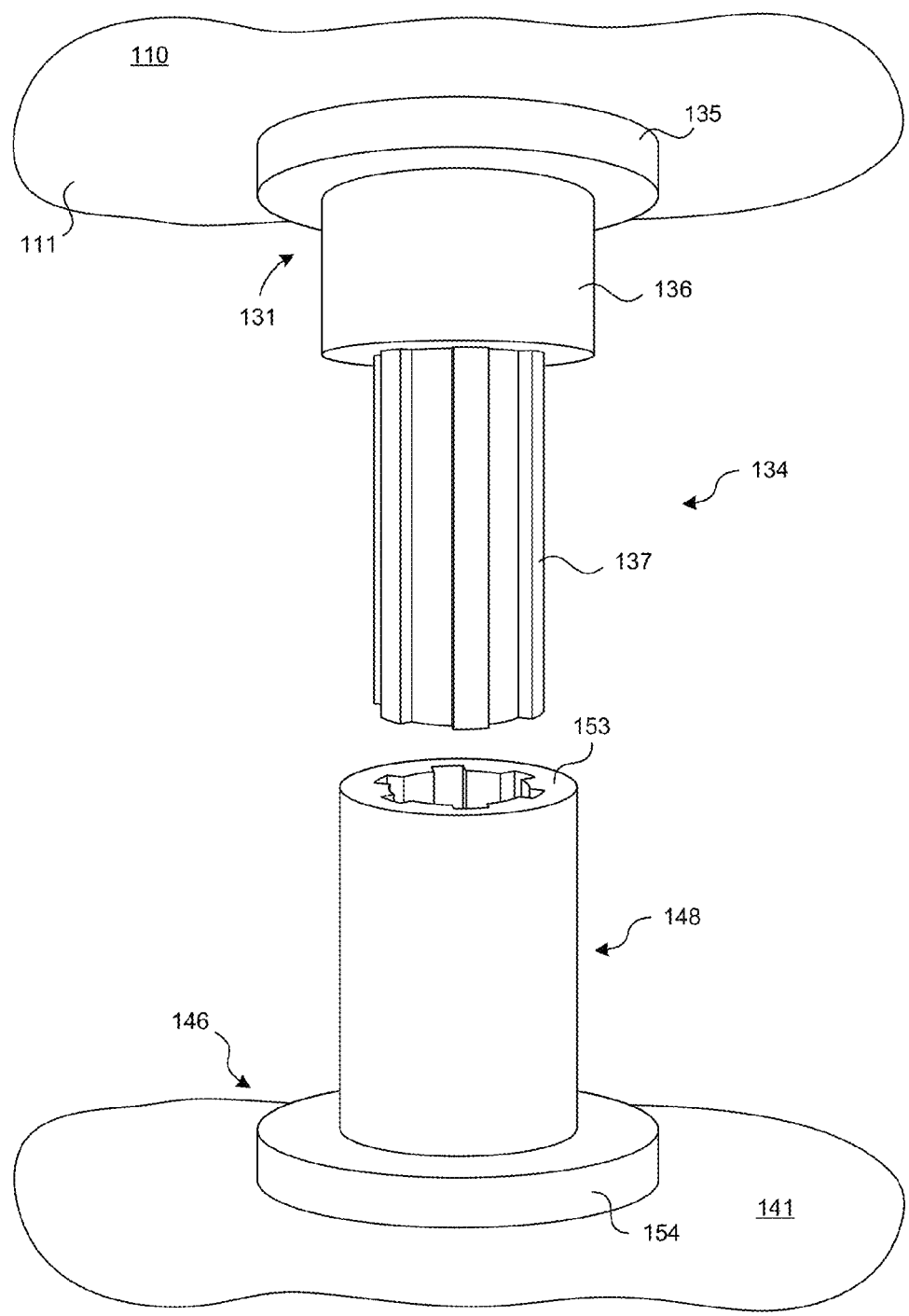
FIG. 4 is a partially schematic, isometric illustration of an arrangement for releasably coupling the off-board and the on-board portions of a pre-rotator system in accordance with an embodiment of the present technology.

As discussed above, one feature of the pre-rotator 120 is that it includes a releasable transmission link between pre-rotator components located on the gyrocopter 110 and pre-rotator components located off the gyrocopter 110. FIG. 4 illustrates a representative arrangement of such a device. As shown in FIG. 4, the gyrocopter 110 and its associated on-board transmission device 131 can include a shaft 136 that projects outwardly from the lower surface of the gyrocopter body 111. The shaft 136 can be supported by a bearing 135, and can include or be connected to a male spline element 137 that forms the second coupling 134. The off-board transmission device 146 can include a complementary arrangement. Accordingly, the off-board transmission device can include a female spline element 153 that forms the first coupling 148 and that is carried by the base 141. A corresponding bearing 154 supports the female spline element 153 and allows it to rotate and transmit torque to the male spline element 137 when the two are engaged.

During operation, the gyrocopter 110 can be positioned relative to the base 141 so that the male spline element 137 engages with the female spline element 153. This can be accomplished by setting the gyrocopter 110 down in the appropriate position and/or by translating the gyrocopter 110, depending upon the relative orientation of the male spline element 137 and the female spline element 153. In any of these embodiments, the male and female spline elements 137, 153 maintain engagement with each other until the pre-rotation process has been completed.

As discussed above, the gyrocopter 110 can be held in position during the pre-rotation process via the restraint system 142 (shown in FIGS. 1-3). The restraint system 142 can be actively engaged (e.g., via one or more actuators) prior to the pre-rotation process, and actively disengaged once the gyrocopter rotor 112 has been spun up to a suitable rotation rate. In another embodiment, the ground-based first coupling 148 and the gyrocopter-based second coupling 134 can provide both a torque-transmitting function and a restraint function. Accordingly, the separate restraint system 142 can be simplified or eliminated. In a particular example, the friction between the male spline element 137 and the female spline element 153 (while the first coupling 148 is accelerating) can be sufficient to prevent the gyrocopter from lifting from the base 141 and thereby disengaging the male spline element 137 from the female spline element 153. Once the gyrocopter rotor 112 has been accelerated to a sufficient rotational speed, the controller can interrupt or reduce the power provided to the first coupling 148 by the power source 145 (FIG. 3). At that point, the first coupling 148 is no longer accelerating, and the frictional forces between the female spline element 153 and the male spline element 137 decrease to the point at which the gyrocopter 110 begins to lift. As the gyrocopter 110 lifts, the male spline element 137 disengages from the female spline element 153. This arrangement can accordingly eliminate the need for a separate actuatable vertical restraint. In at least some embodiments, the base 141 may still include one or more lateral restraints 144 (FIG. 3) to prevent the gyrocopter from rotating. A similar restraint, albeit a passive restraint, can be positioned forward of the wheels 118 to prevent the gyrocopter from rolling forward during the pre-rotation process.

Figure 5A:
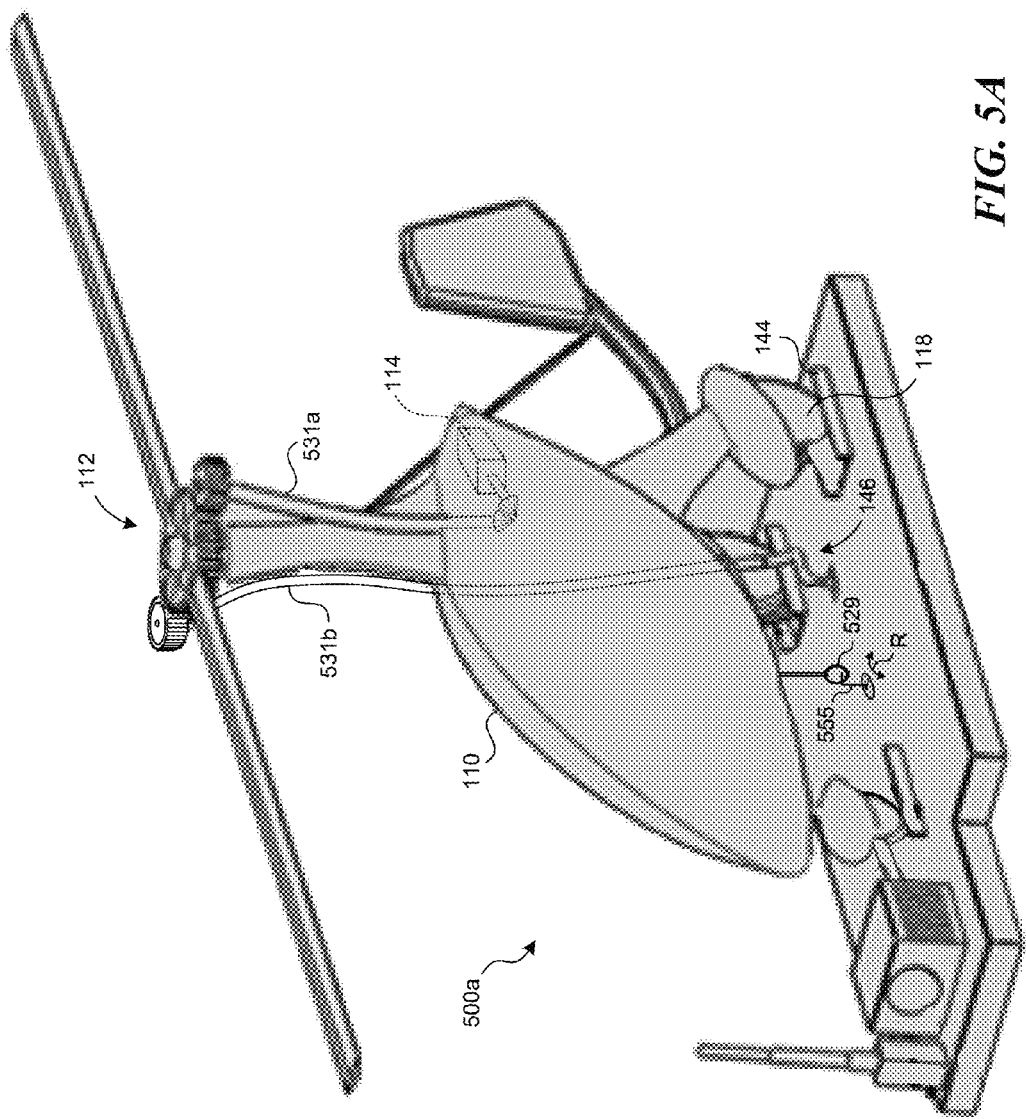
FIG. 5A is a partially schematic, front isometric illustration of a system that provides power for a pre-rotator from both on-board and off-board the gyrocopter, in accordance with an embodiment of the present technology.

In other embodiments, the system can include other configurations that perform some or all of the functions described above. For example, FIG. 5A illustrates a system 500a for which the vertical restraint is provided by a ring 529 or other element projecting downwardly from the gyrocopter 110, which is engaged by a hook 555 or other element. The hook 555 can rotate on a pivot pin, as indicated by arrow R. Accordingly, the hook 555 can engage the ring 529 to restrain the gyrocopter 110 from vertical motion, and can disengage from the ring 529 to allow the gyrocopter 110 to lift. Optionally, the lateral restraints 144 can remain to prevent rotational movement of the gyrocopter. In another embodiment, the downward force provided by the hook 555 and its engagement with the ring 529 can prevent the gyrocopter 110 from rotating about its vertical axis, and/or from rolling forward.

Another feature of an embodiment shown in FIG. 5A is that the pre-rotation torque required for lifting the gyrocopter 110 can be provided by both off-board and on-board power sources. For example, the overall system 500a can include a first on-board transmission device 531a coupled to the on-board power source 114, and a second on-board transmission device 531b coupled to the off-board transmission device 146. Using this arrangement, the on-board power source 114 can provide additional power to the lift rotor 112 to lift the gyrocopter 110 without a take-off roll and without pitching the rotor blades 119.

Figure 5B:
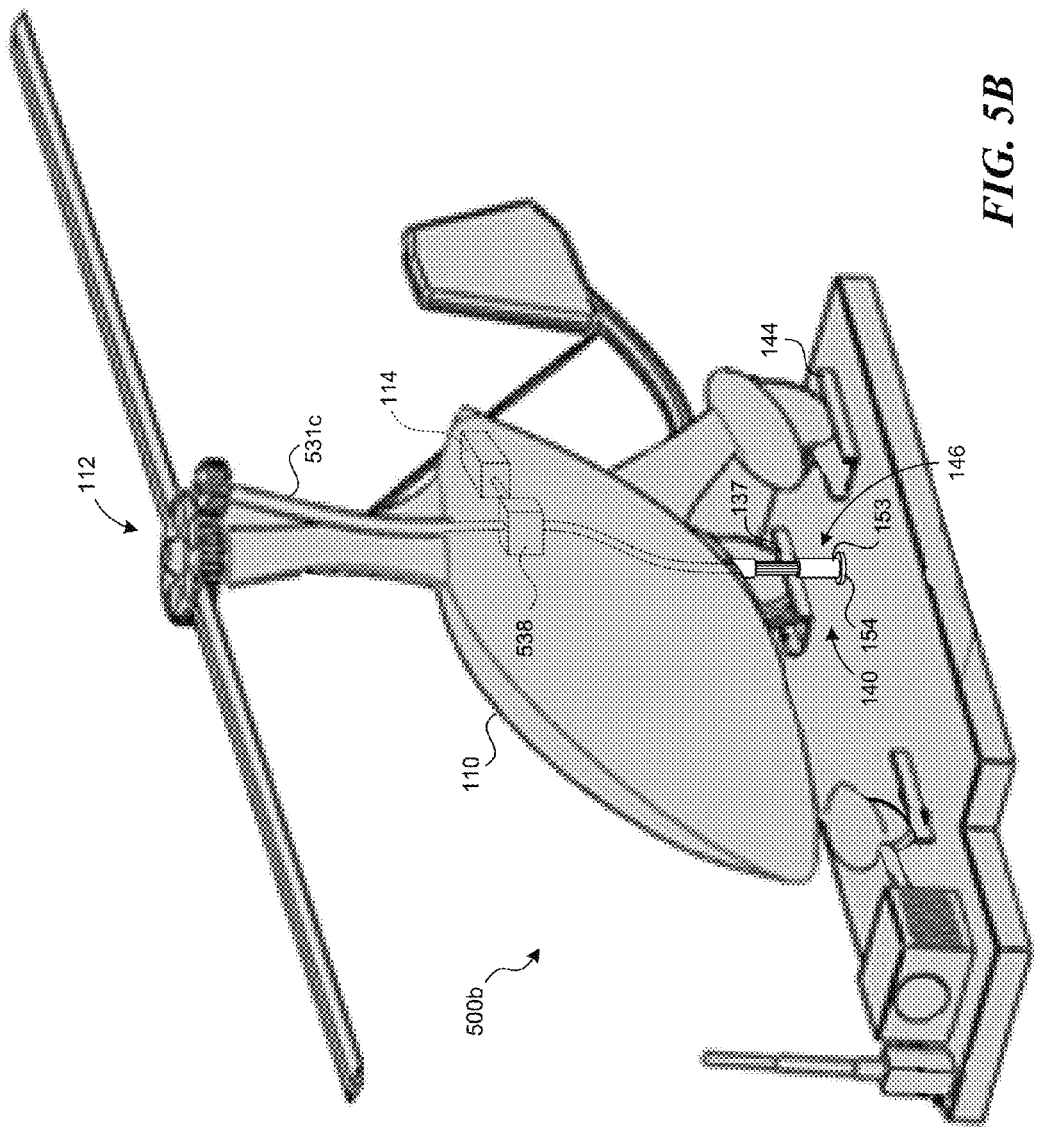
FIG. 5B is a partially schematic, front isometric illustration of a system that includes power for a pre-rotator supplied from both on-board and off-board the gyrocopter in accordance with another embodiment of the present technology.

FIG. 5B illustrates a system 500b configured in accordance with still another embodiment of the present technology. In this embodiment, the gyrocopter 110 includes a single on-board transmission device 531c that is coupled to both the on-board motor 114 and the off-board pre-rotator components 140. Accordingly, the system 500b can include a power coupling 538 that receives power from both the motor 114 and the ground-based components 140, and provides the power to the vehicle transmission device 531c for pre-rotating the rotor 112.

As is also shown in FIG. 5B, and as was discussed above with reference to FIG. 4, the vertical restraints have been eliminated. Instead, the friction provided between the male spline element 137 and the female spline element 153 are sufficient to keep the on-board transmission device 531c engaged with the off-board transmission device 146 during the rotor spin-up process. Once the female spline element 153 ceases accelerating (e.g., at a pre-specified value of rotations per minute), the male spline element 137 disengages as the gyrocopter 110 lifts.

Figure 6A:
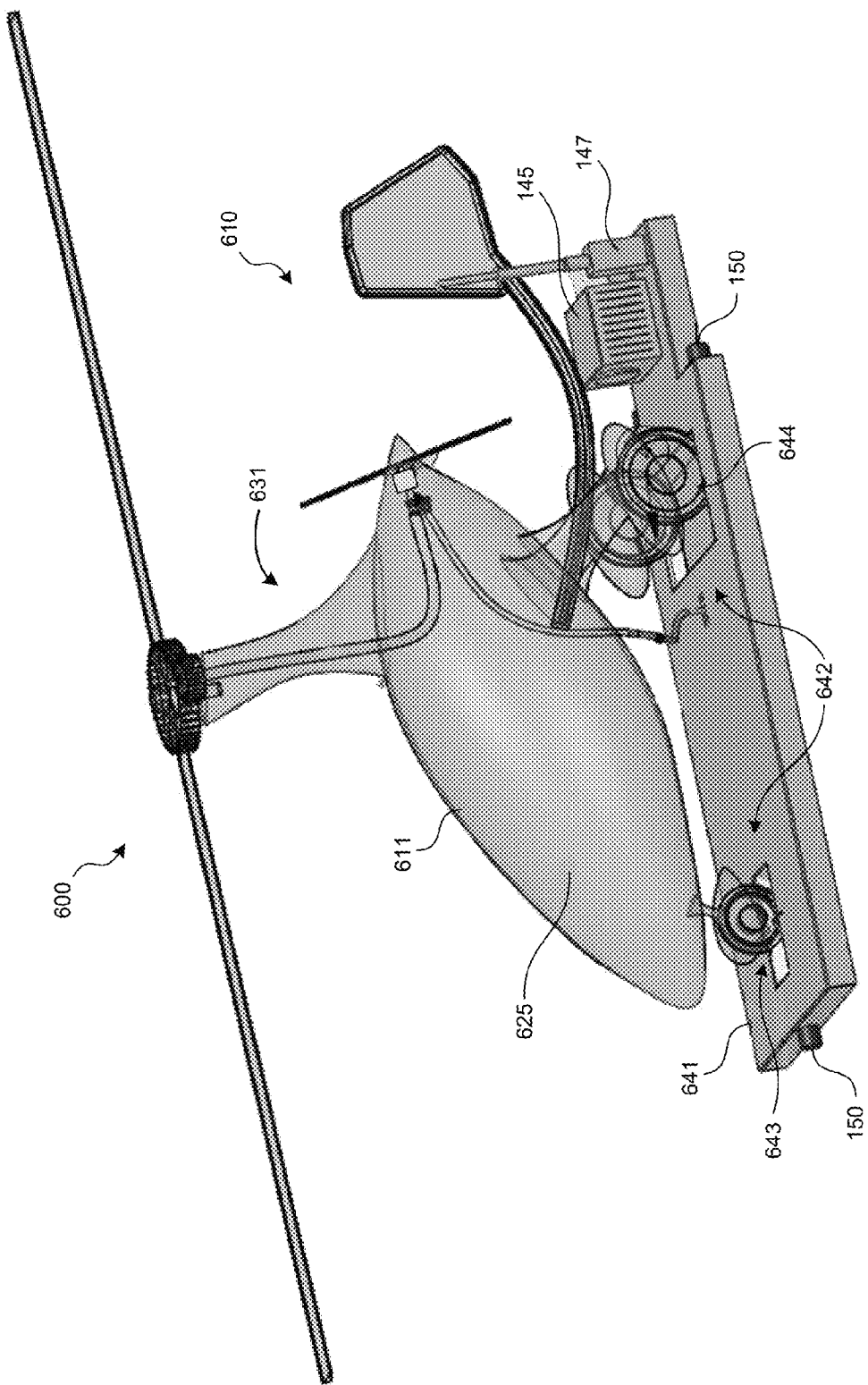
FIG. 6A is a partially schematic, side isometric illustration of a gyrocopter and pre-rotator system configured in accordance with another embodiment of the present technology.

FIG. 6A is a partially schematic, side isometric view of a system 600 having a gyrocopter 610 and associated pre-rotator components configured in accordance with another embodiment of the present technology. In one aspect of this embodiment, the gyrocopter 610 includes a body 611 housing a flight deck 625 (for manned systems) and carrying an on-board transmission device 631. The on-board transmission device 631 has an arrangement described in further detail below with reference to FIG. 6C.

The system 600 can further include a base or support 641 having a restraint system 642 that includes lateral restraints 644. The lateral restraints 644 and vertical restraints 643 are described further below with reference to FIG. 6B.

Figure 6B:
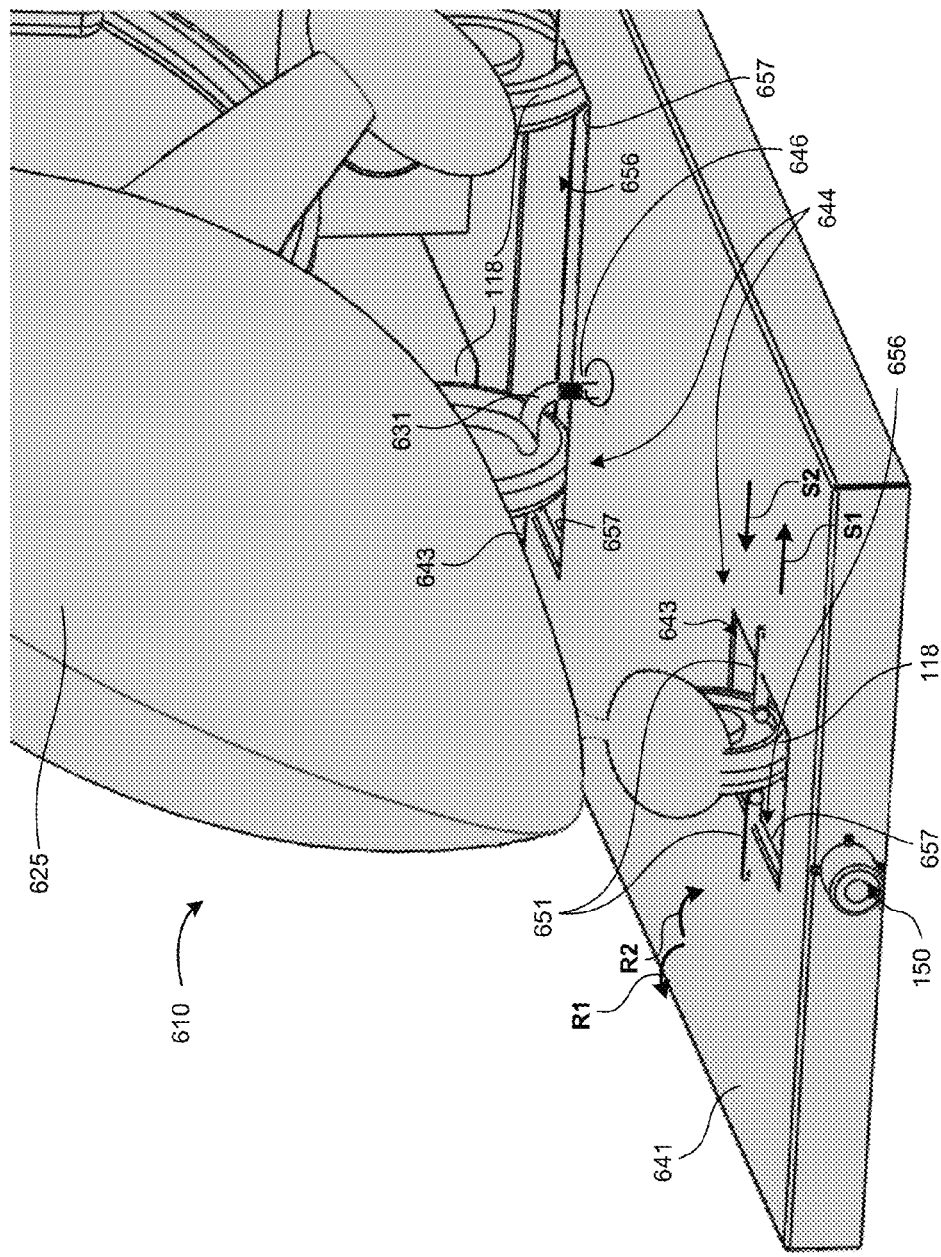
FIG. 6B is an enlarged, front isometric illustration of the arrangement shown in FIG. 6A.

Referring now to FIG. 6B, the lateral restraints 644 can be formed from corresponding channels 656 having channel walls 657 that restrict the lateral motion of the gyrocopter wheels 118. The restraint system 642 can further include one or more vertical restraints 643 that directly engage with the wheels 118. For example, the vertical restraints 643 can include engagement elements 651 that slide outwardly and inwardly (as indicated by arrows S1 and S2) or rotate outwardly and inwardly (as indicated by arrows R1 and R2) between disengaged and engaged positions. An advantage of the channels 657 shown in FIGS. 6A, 6B is that they can be simpler to use and/or less obtrusive than the lateral restraints 144 discussed above with reference to FIG. 3. The system 600 can further include on-board and off-board transmission devices 631, 646, described further below.

FIG. 6C is an enlarged view of the rear portion of the gyrocopter 610, illustrating an on-board power source 614 driving a propeller 613. In addition, the on-board transmission device 631 can include two links: a first on-board link 622a and a second on-board link 622b. The on-board links 622a, 622b can be selectively coupled to each other using gears 624 or other suitable coupling devices, and can be selectively engaged or disengaged with each other as indicated by arrow B. When the gears 624 are engaged with each other, the off-board transmission device 646 provides power to the second on-board link 622b and the rotor above (not visible in FIG. 6C). When the gears 624 or other coupling elements are disengaged, the off-board transmission device does not provide power to the rotor. In such instances, the on-board power source 614 can provide power to the second on-board link 622b via a drive link 621. In a particular embodiment, the drive link 621 can also be selectively coupled to or decoupled from the second on-board link 622b. Accordingly, this arrangement can be used to provide power to the rotor during a pre-rotator spin-up from the off-board transmission device 646, the on-board power source 614, or both.

Figure 7A:
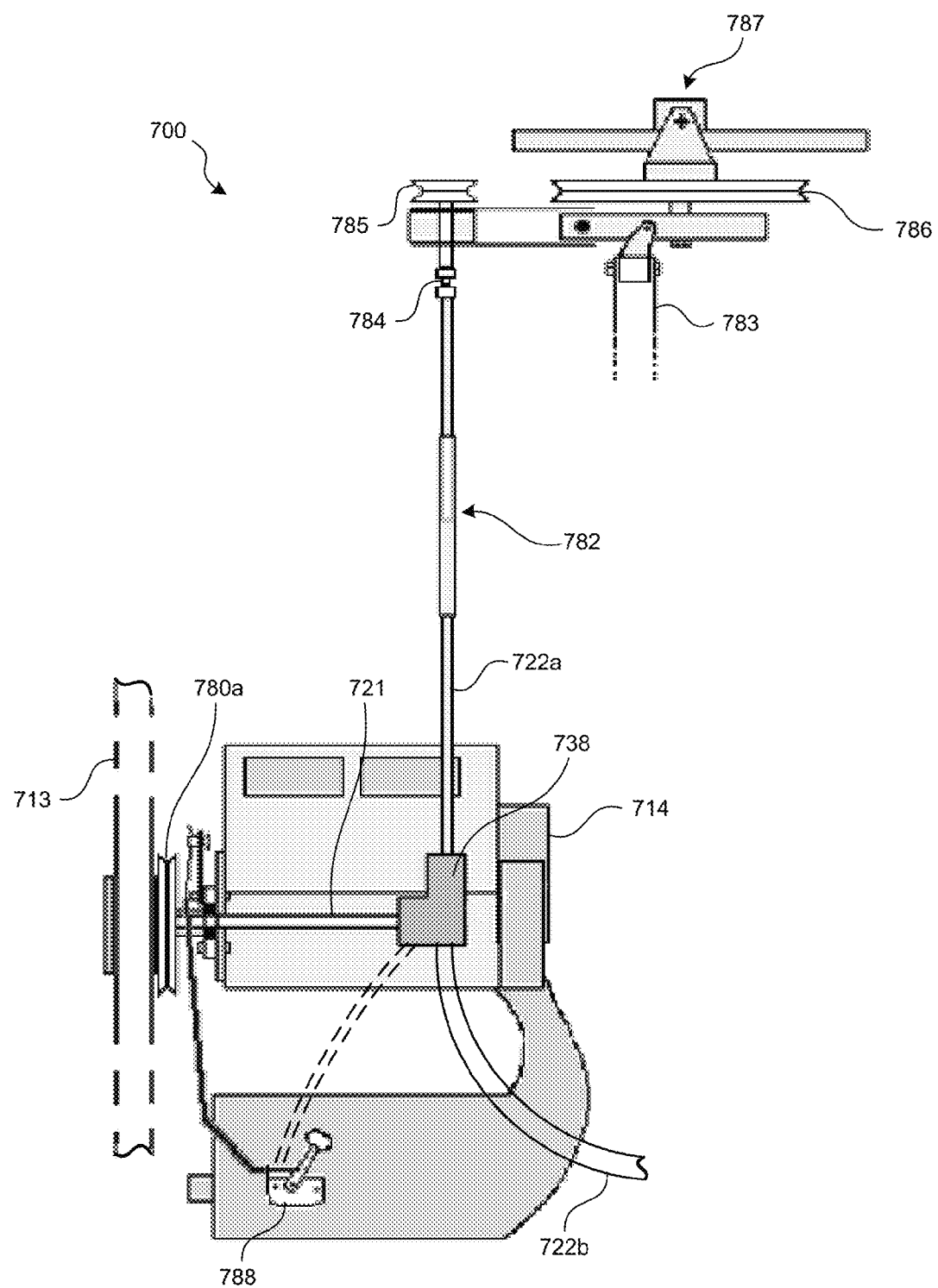
FIG. 7A is a partially schematic, side elevation view of a pre-rotator system configured in accordance with still another embodiment of the present technology.
Figure 7B:
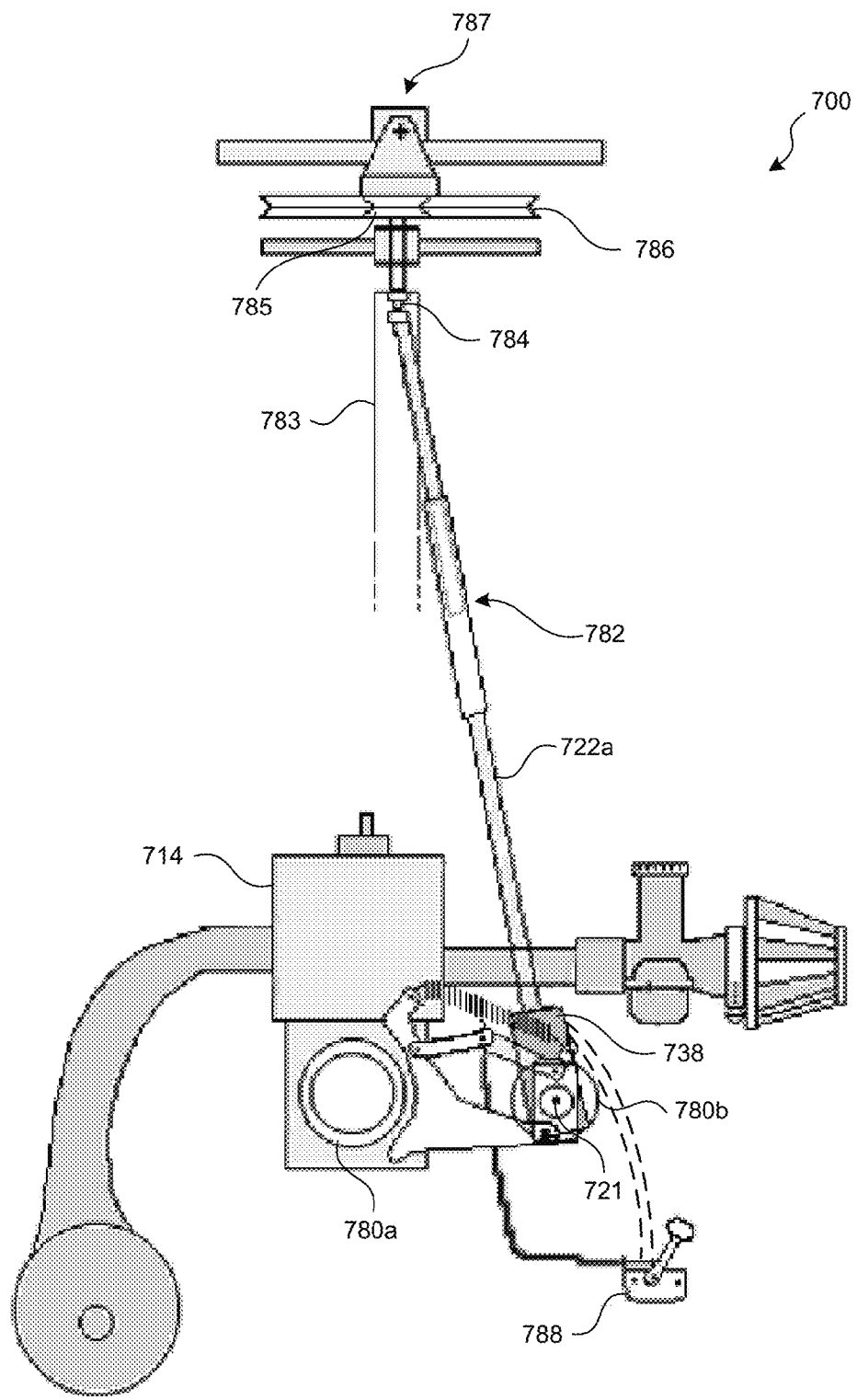
FIG. 7B is a front view of the system shown in FIG. 7A.

FIGS. 7A and 7B are partially schematic, side and front elevation views, respectively, of an existing pre-rotator system (a Bumble Bee gyrocopter system, plans available at www.aircraftdesigns.com/Plans/Bumble-Bee-Plans/fly-page_new.tpl.html) that has been retrofitted to support an off-board pre-rotator function, in accordance with yet another embodiment of the present technology. Referring to FIGS. 7A and 7B together, the on-board components of the overall system 700 can include an on-board power source 714 (e.g., an internal combustion engine) that provides power to a propeller 713. A first pulley 780a is located behind the propeller 713 and can be used to transfer power to a second pulley 780b that is in turn carried by a drive link 721. Accordingly, the two pulleys 780a, 780b can transmit power from the on-board power source 714 to the drive link 721. The drive link 721 is in turn coupled to a rotor head assembly 787 (with the rotor blades removed for purposes of illustration) to provide a pre-rotator function. In particular, the drive link 721 is coupled to a gear box assembly or power coupling 738 that transmits the power it receives to a first on-board link 722, for example, a square tubing drive shaft. The first on-board link 722 can include a square tubing slip joint 782 or other suitable structure for allowing relative movement among the components, and a universal joint 784 that is in turn coupled to a pulley/ratchet 785. The pulley/ratchet 785 is in turn coupled to a rotor pulley 786 (via a belt, not shown) that is coupled to the rotor head assembly 787. The rotor head assembly 787 is carried by a mast 783.

The operation of the pre-rotator shown in FIGS. 7A and 7B can be controlled from on-board the gyrocopter by using an engage/disengage lever 788 that engages or disengages the drive link 721 from the first power source 714, e.g., by engaging/disengaging the first and second pulleys 7801, 780b. In a particular aspect of the present technology, the system has been retrofitted to include a second on-board link 722b (e.g., a flexible shaft) that is coupled to the power coupling 781, which has also been retrofitted to accommodate it. The engage/disengage lever 788 (or an additional lever) can also be coupled to the power coupling 738 (as shown in dashed lines) to engage or disengage the second on-board link 722b from the first on-board link 722a. Accordingly, the operator can provide pre-rotator power to the rotor head assembly 787 from the on-board power source 714, or the off-board power source (not shown in FIGS. 7A and 7B) via the second on-board link 722b, or via both on-board and off-board power sources.

An advantage of the arrangement shown in FIGS. 7A and 7B is that it can be versatile, for example, by using the on-board power source 714 when necessary, and/or off-board power when available. An additional advantage of the arrangement shown in FIGS. 7A and 7B is that it can be retrofitted to an existing pre-rotator arrangement.

Figure 8:
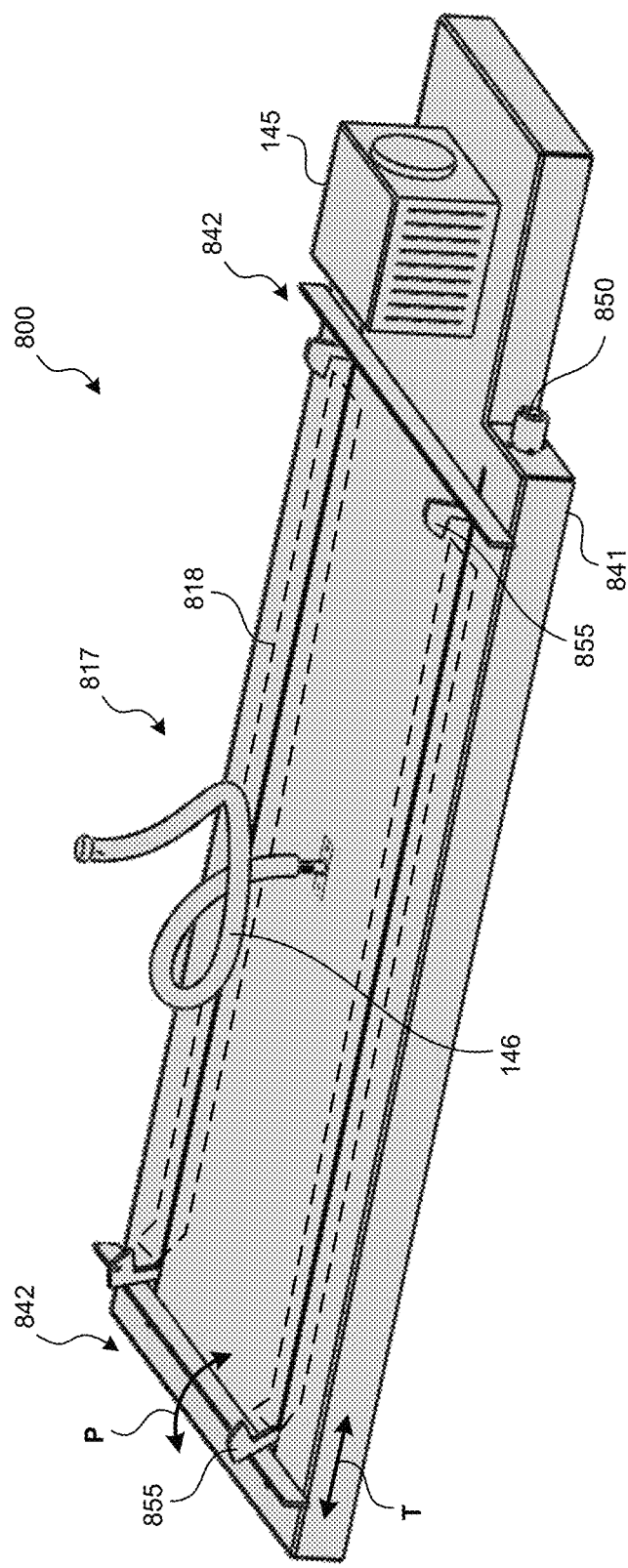
FIG. 8 is a partially schematic side elevation view of a system configured to restrain a gyrocopter having skis or skids, in accordance with still another embodiment of the present technology.

FIG. 8 is a partially schematic illustration of a portion of a system 800 suitable for supporting a gyrocopter having skids or skis 818 (shown in dashed lines) during a pre-rotation operation in accordance with an embodiment of the present technology. In a particular aspect of this embodiment, the system 800 includes a base 841 carrying a restraint system 842 that can be operated via a release mechanism 850. The restraint system 842 can include multiple hooks or other engaging members 855 that can rotate and/or slide (as indicated by arrows P and T, respectively) within and relative to corresponding slots 818 to selectively engage with and disengage from the skids or skis 818. Other aspects of the operation of the system 800 can be generally similar to those described above. In still further embodiments, other arrangements can be used to restrain the gyrocopter during a pre-rotation operation.

Figure 9:
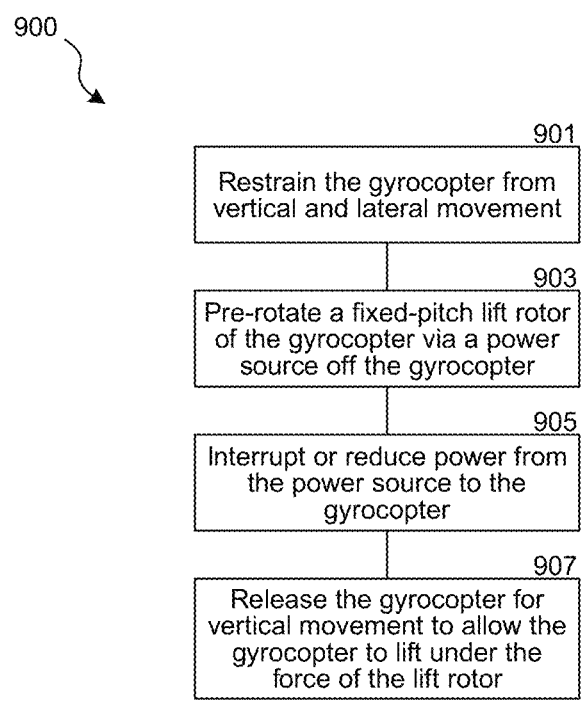
FIG. 9 is a flow diagram illustrating a representative process for pre-rotating a gyrocopter rotor in accordance an embodiment of the present technology.

FIG. 9 is a flow diagram illustrating a representative method 900 for pre-rotating a gyrocopter rotor for take-off in accordance with an embodiment of the present technology. Block 901 includes restraining the gyrocopter from vertical and lateral movement. As discussed above, one or more restraining devices can perform this function and, in at least some embodiments, the restraining function can be provided at least in part by system components that also perform the function of spinning up the gyrocopter rotor.

At block 903, the process includes pre-rotating the fixed-pitch lift rotor of the gyrocopter via a power source located off the gyrocopter. For example, as discussed above, a motor or other power source located off-board the gyrocopter can be releasably coupled to a transmission system carried by the gyrocopter to spin up the gyrocopter rotor. In some embodiments, the off-board power source can be the sole power source that spins up the rotor, and in other embodiments, the power provided by the off-board power source can be supplemented by power provided by an on-board power source. In any of these embodiments, the on-board power source can also be activated so as to provide thrust once the gyrocopter has lifted.

At block 905, the method includes interrupting or reducing power from the off-board power source to the gyrocopter, e.g., by shutting the power source down or significantly reducing the output power of the power source, e.g., to an idle setting. For example, the off-board power source can include a switch that is thrown to interrupt the power. The switch can be triggered manually in some embodiments, and automatically in others. For example, a human operator or an automatic controller can trigger the switch in response to an indication that the rotor speed (tip speed or rotational speed) has met a pre-determined threshold. Representative tip speeds are from about 400 mph to about 450 mph, and representative rotation rates are from about 260 rpm to about 270 rpm or to about 300 rpm.

At block 907, the process includes releasing the gyrocopter for vertical movement to allow the gyrocopter to lift under the force of the lift rotor. As discussed above, the process of releasing the gyrocopter can include actively removing restraints that restrict the gyrocopter from vertical and lateral movement. In other embodiments, the process of interrupting the power from the power source to the gyrocopter can allow the transmission components that provide the power to the gyrocopter to disengage or release without requiring a separate, active step. Instead, the loss of component acceleration resulting from interrupting or reducing the power can allow the components to release on their own. Once the gyrocopter has lifted a sufficient distance, it begins normal flight operations via the combination of thrust provided by the thrust propeller, and lift provided by the rotor.

In at least some of the embodiments described above with reference to FIGS. 1-9, the disclosed systems include both on-board (e.g., ground-based) and off-board (e.g., vehicle-based) pre-rotator components. By supplying power from off-board the vehicle, the amount of power available to pre-rotate the gyrocopter rotor is increased, by virtue of on the off-board power alone, or the off-board power in combination with power provided on-board the vehicle. In either embodiment, the power provided to the gyrocopter rotor is sufficient to lift the gyrocopter without the need for pitch-controlled rotor blades. An advantage of this arrangement is that it can eliminate the complexity and maintenance costs associated with pitchable rotor blades. As a result, the gyrocopter can take off and land vertically, without the need for take-off and/or landing ground rolls. Still a further result is that the gyrocopter can provide a cost-competitive solution for applications that require or benefit from vertical take-off and landing, without the expense required for pitch control and/or other complexities associated with typical helicopter configurations. Representative applications that can benefit from this approach include agricultural applications, police or other law enforcement applications, tuna fishing and/or other marine applications, as well as a wide variety of other purposes. In particular, the effective range/endurance of the gyrocopter can be significantly increased because the gyrocopter need not fly from a distance runway to a job site, but can instead take off directly at or very near the job site.

Another feature of at least some of the foregoing embodiments is that the additional power provided by the off-board power source can be provided by a significantly wider array of available power sources that if the power source were located on-board the gyrocopter. For example, because the off-board power source is not carried by the gyrocopter, it need not be lightweight (or at least not as lightweight as components carried by the gyrocopter) and need not comply with at least some regulatory requirements that are directed to components carried by the gyrocopter in flight. As a result, the off-board power source can be relatively inexpensive when compared to a corresponding on-board power source.

From the foregoing, it will be appreciated that specific embodiments of the present technology have been described herein for purposes of illustration, but that various modifications may be made without deviating from the technology. For example, the gyrocopter can be manned with an on-board pilot in some embodiments, and can be unmanned in others. The drive mechanisms described above can have configurations different than those shown in the foregoing figures, for example, a hydraulic line configuration or other suitable link. The gyrocopter itself can have configurations other than those shown in the Figures. In some embodiments, as shown above, the releasable connection between the ground-based components and the gyrocopter-based components of the pre-rotator system can include a spline having male and female components. The male component(s) can be carried on-board the gyrocopter and the female component(s) off-board, or vice versa depending on the embodiment. In still further embodiments, the releasable connection can include devices other than splines (e.g., spiral gears) that can engage and disengage with or without the aid of an actuator or other active device. For example, in some embodiments, the on-board transmission device is coupled to the off-board transmission device via a separately-activatable device (e.g., a solenoid-driven coupling) that releases based on a command from an automated controller, or an in-the-loop operator. The controller can issue the command in response to an input corresponding to a change in power (e.g., a decrease) provided by the off-board power source.

Certain aspects of the technology described in the context of particular embodiments may be combined or eliminated in other embodiments. For example, in some embodiments, some or all of the foregoing components can be retrofitted to an existing gyrocopter, and in other embodiments, can be incorporated into a new gyrocopter design. When retrofitted, the components can supplement existing pre-rotator components of the gyrocopter. Further, while advantages associated with certain embodiments of the present technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

I claim:

1. A system for pre-rotating a gyrocopter, comprising:
   a restraint positionable to at least restrict lateral and vertical motion of a gyrocopter;
   a power source;
   a transmission device coupled to the power source, the transmission device being releasably coupleable to a pre-rotator carried by the gyrocopter; and
   a portable base, wherein the restraint, the power source, and the transmission device, are fixedly connected to the portable base during operation of the transmission device.

2. The system of claim 1 wherein:
   the restraint includes multiple lateral restraints, each positioned to engage a side surface of a wheel of the gyrocopter;
   the restraint further includes multiple vertical restraints, each positioned to engage an at least partially upwardly-facing surface of one of the wheels of the gyrocopter; and
   the transmission device includes a flexible rotatable shaft positioned in a sleeve, the shaft being coupled to a coupling that includes a spline element and is positioned to receive a corresponding coupling carried by the gyrocopter.

3. The system of claim 1, further comprising the gyrocopter, and wherein the gyrocopter is releasably coupled to the transmission device, further wherein the power source is positioned off-board the gyrocopter.

4. The system of claim 1 wherein the power source includes a battery.

5. The system of claim 1 wherein the power source includes an internal combustion engine.

6. The system of claim 1 wherein the restraint is configured to releasably engage with a landing gear of the gyrocopter.

7. The system of claim 6 wherein the restraint includes at least one lateral restraint positioned to engage with a lateral surface of the landing gear of the gyrocopter.

8. The system of claim 6 wherein the restraint includes at least one vertical restraint positioned to engage with an at least partially upwardly facing surface of the at least one landing gear.

9. The system of claim 1, further comprising a release mechanism coupled to the restraint and having a first configuration in which the restraint mechanism is positioned to restrain the gyrocopter and a second configuration in which the restraint mechanism is positioned not to restrain the gyrocopter.

10. The system of claim 1, further comprising a controller operatively coupled to the transmission device, the controller being configured to engage the transmission device with the gyrocopter and disengage the transmission device from the gyrocopter.

11. The system of claim 10 wherein the controller is programmed to receive an input corresponding to a change of power provided by the transmission device to the gyrocopter and, in response to receiving the signal, disengage the transmission device from the gyrocopter.

12. The system of claim 1 wherein the transmission device includes an off-board coupling configured to releasably engage with a corresponding on-board coupling carried by the gyrocopter.

13. The system of claim 12 wherein the off-board coupling includes a spline coupling that is slideable between an engaged and a disengaged position with the onboard coupling.

14. A gyrocopter system, comprising:
    a gyrocopter that includes:
      a body;
      a propeller;
      a first power source coupled to the propeller; and
      a lift rotor; and
    a pre-rotator arrangement that includes:
      a restraint positioned to at least restrict lateral and vertical motion of a gyrocopter;
      a second power source;
      a transmission device having an on-board portion carried by the gyrocopter and an off-board portion carried off the gyrocopter, the on-board portion being coupled to the rotor and having an onboard coupling, the off-board portion being coupled to the second power source and having an offboard coupling releasably coupleable to the onboard coupling; and
      a controller operably coupled to the second power source and configured to direct an amount of power provided by the second power source to the lift rotor.

15. The system of claim 14 wherein the lift rotor is a fixed-pitch lift rotor.

16. The system of claim 14 wherein the onboard coupling includes one of a female spline element and a male spline element, and the offboard coupling includes the other of the female spline element and the male spline element.

17. The system of claim 14, further comprising a drive link coupled between the first power source and the lift rotor.

18. The system of claim 14, further comprising a power coupling coupleable among the lift rotor, the first power source and the second power source to selectively couple at least one of the first and second power sources to the lift rotor.

19. The system of claim 18 wherein the power coupling has four configurations:
a first configuration with the lift rotor decoupled from both the first power source and the second power source;
a second configuration with the lift rotor coupled to the first power source and not the second power source;
a third configuration with the lift rotor coupled to the second power source and not the first power source; and
a fourth configuration with the lift rotor coupled to both the first power source and the second power source.

20. The system of claim 14 wherein the gyrocopter includes a wheeled landing gear, and wherein the restraint is positioned to releasably engage with the wheeled landing gear.

21. The system of claim 14 wherein the gyrocopter includes a landing gear having a skid, and wherein the restraint is positioned to releasably engage with the skid.

22. A system for pre-rotating a gyrocopter, comprising:
a restraint positionable to at least restrict lateral and vertical motion of a gyrocopter;
a power source;
a transmission device coupled to the power source, the transmission device being releasably coupleable to a pre-rotator carried by the gyrocopter; and
a base carrying the restraint, the power source and the transmission device; and wherein
the restraint includes multiple lateral restraints, each positioned to engage a side surface of a wheel of the gyrocopter;
the restraint further includes multiple vertical restraints, each positioned to engage an at least partially upwardly-facing surface of one of the wheels of the gyrocopter; and
the transmission device includes a flexible rotatable shaft positioned in a sleeve, the shaft being coupled to a coupling that includes a spline element and is positioned to receive a corresponding coupling carried by the gyrocopter.

23. A gyrocopter system, comprising:
a gyrocopter that includes:
a body;
a propeller;
a first power source coupled to the propeller; and
a lift rotor; and
a pre-rotator arrangement that includes:
a restraint positionable to at least restrict lateral and vertical motion of a gyrocopter;
a second power source;
a transmission device having an on-board portion carried by the gyrocopter and an off-board portion carried off the gyrocopter, the on-board portion being coupled to the rotor and having an onboard coupling, the off-board portion being coupled to the second power source and having an offboard coupling releasably coupleable to the onboard coupling; and
a drive link coupled between the first power source and the lift rotor.

24. A gyrocopter system, comprising:
a gyrocopter that includes:
a body;
a propeller;
a first power source coupled to the propeller; and
a lift rotor; and
a pre-rotator arrangement that includes:
a restraint positionable to at least restrict lateral and vertical motion of a gyrocopter;
a second power source;
a transmission device having an on-board portion carried by the gyrocopter and an off-board portion carried off the gyrocopter, the on-board portion being coupled to the rotor and having an onboard coupling, the off-board portion being coupled to the second power source and having an offboard coupling releasably coupleable to the onboard coupling; and
a power coupling coupleable among the lift rotor, the first power source and the second power source to selectively couple at least one of the first and second power sources to the lift rotor.

25. The system of claim 24 wherein the power coupling has four configurations:
a first configuration with the lift rotor decoupled from both the first power source and the second power source;
a second configuration with the lift rotor coupled to the first power source and not the second power source;
a third configuration with the lift rotor coupled to the second power source and not the first power source; and
a fourth configuration with the lift rotor coupled to both the first power source and the second power source.

26. A gyrocopter system, comprising:
a gyrocopter having landing gear; and
a pre-rotator arrangement that includes:
a restraint positionable to at least restrict lateral and vertical motion of the gyrocopter;
a power source off-board the gyrocopter; and
a transmission device coupled to the power source, at least a portion of the transmission device being off-board the gyrocopter and releasably coupleable to a pre-rotator carried by the gyrocopter.

27. The system of claim 26 wherein the landing gear includes a wheeled landing gear, and wherein the restraint is positioned to releasably engage with the wheeled landing gear.

28. The system of claim 26 wherein the landing gear includes a skid, and wherein the restraint is positioned to releasably engage with the skid.

29. The system of claim 26, further comprising a portable base carrying the restraint, the power source, and the transmission device.

30. The system of claim 26 wherein the restraint is configured to releasably engage with the landing gear of the gyrocopter.

31. The system of claim 30 wherein the restraint includes at least one lateral restraint positioned to engage with a lateral surface of the landing gear of the gyrocopter.

32. The system of claim 30 wherein the restraint includes at least one vertical restraint positioned to engage with an at least partially upwardly facing surface of the at least one landing gear.

33. The system of claim 30, further comprising a release mechanism coupled to the restraint and having a first configuration in which the restraint mechanism is positioned to restrain the gyrocopter and a second configuration in which the restraint mechanism is positioned not to restrain the gyrocopter.

34. A system for pre-rotating a gyrocopter, comprising:
- a restraint positionable to at least restrict lateral and vertical motion of a gyrocopter;
- a power source;
- a transmission device coupled to the power source, the transmission device being releasably coupleable to a pre-rotator carried by the gyrocopter; and
- a controller operatively coupled to the transmission device, the controller being configured to engage the transmission device with the gyrocopter, the transmission device including an off-board coupling configured to releasably engage with a corresponding on-board coupling carried by the gyrocopter and disengage the transmission device from the gyrocopter.

35. The system of claim 34 wherein the controller is programmed to receive an input corresponding to a change of power provided by the transmission device to the gyrocopter and, in response to receiving the signal, disengage the transmission device from the gyrocopter.

36. The system of claim 34, further comprising the gyrocopter, and wherein the gyrocopter is releasably coupled to the transmission device, further wherein the power source is positioned off-board the gyrocopter.

37. The system of claim 34 wherein the off-board coupling includes a spline coupling that is slideable between an engaged and a disengaged position with the onboard coupling.

* * * * *